US012755453B2

(12) United States Patent
Choi et al.

(10) Patent No.: US 12,755,453 B2
(45) Date of Patent: Oct. 6, 2026

(54) SYSTEM AND METHOD FOR GENERATING SMART MAP

(71) Applicant: VESTELLALAB INC., Seoul (KR)

(72) Inventors: Yung Ji Choi, Seongnam-si (KR); Sangsu Jung, Seoul (KR); Eun Jung Lee, Euiwang-si (KR)

(73) Assignee: VESTELLALAB INC., Seoul (KR)

( * ) Notice: Subject to any disclaimer, the term of this patent is extended or adjusted under 35 U.S.C. 154(b) by 120 days.

(21) Appl. No.: 18/891,992

(22) Filed: Sep. 20, 2024

(65) Prior Publication Data

US 2025/0104300 A1 Mar. 27, 2025

(30) Foreign Application Priority Data

Sep. 22, 2023 (KR) ........................ 10-2023-0126747

(51) Int. Cl.
*G06T 11/00* (2026.01)
*G06F 16/29* (2019.01)
*G06T 7/13* (2017.01)
*G06T 11/23* (2026.01)
*G06V 30/422* (2022.01)

(52) U.S. Cl.
CPC .............. *G06T 11/23* (2026.01); *G06F 16/29* (2019.01); *G06T 7/13* (2017.01); *G06V 30/422* (2022.01)

(58) Field of Classification Search
None
See application file for complete search history.

(56) References Cited

U.S. PATENT DOCUMENTS

| | | | | |
|---|---|---|---|---|
| 8,606,499 B2 * | 12/2013 | Li | G08G 1/143 | 340/932.2 |
| 10,062,132 B2 * | 8/2018 | Eramian | G06Q 10/02 | |
| 10,115,307 B1 * | 10/2018 | Upton | G08G 1/146 | |
| 10,275,843 B2 * | 4/2019 | Shike | G06Q 10/06313 | |
| 10,816,993 B1 * | 10/2020 | Tran | G06N 3/045 | |
| 11,460,829 B2 * | 10/2022 | Uemura | G05B 19/4097 | |
| 11,720,720 B2 * | 8/2023 | Ha | G06F 30/12 | 703/1 |
| 11,842,551 B1 * | 12/2023 | Franc | G08G 1/065 | |
| 11,853,077 B1 * | 12/2023 | Glas | G05D 1/6482 | |
| 12,327,312 B2 * | 6/2025 | Oh | G06T 19/00 | |
| 2002/0129001 A1 * | 9/2002 | Levkoff | G06F 30/13 | |
| 2004/0254840 A1 * | 12/2004 | Slemmer | G06Q 30/0633 | 705/28 |
| 2009/0187384 A1 * | 7/2009 | Nonaka | G06Q 10/1093 | 705/7.29 |

(Continued)

FOREIGN PATENT DOCUMENTS

| | | |
|---|---|---|
| KR | 10-2012-0072124 | 7/2012 |
| KR | 10-1658068 | 10/2016 |

(Continued)

*Primary Examiner* — Martin Mushambo
(74) *Attorney, Agent, or Firm* — KILE PARK REED & HOUTTEMAN PLLC

(57) ABSTRACT

Provided is a method for generating a smart map. The method includes: receiving a pre-prepared unstructured map; extracting and subtracting at least one target element data among a plurality of element data included in the unstructured map; and constructing a smart map based on the extracted element data when the extracting and subtracting of the target element data from the unstructured map is completed.

12 Claims, 15 Drawing Sheets

(56) References Cited

U.S. PATENT DOCUMENTS

| | | | | |
|---|---|---|---|---|
| 2010/0223007 | A1* | 9/2010 | James | G01S 17/89 701/300 |
| 2012/0044091 | A1* | 2/2012 | Kim | G08G 1/146 340/932.2 |
| 2012/0166147 | A1* | 6/2012 | Kwak | G06T 11/60 703/1 |
| 2015/0073660 | A1* | 3/2015 | Lee | G06V 20/586 701/41 |
| 2015/0310744 | A1* | 10/2015 | Farrelly | G08G 1/205 340/932.2 |
| 2016/0321926 | A1* | 11/2016 | Mayer | G08G 1/0129 |
| 2018/0276319 | A1* | 9/2018 | Tierney | G06F 30/13 |
| 2018/0322694 | A1* | 11/2018 | Byers | G06F 30/00 |
| 2019/0096253 | A1* | 3/2019 | Stenneth | G08G 1/143 |
| 2019/0251842 | A1* | 8/2019 | Wunder | G07C 5/008 |
| 2020/0201285 | A1* | 6/2020 | Hirooka | G06V 30/422 |
| 2020/0210638 | A1* | 7/2020 | Cho | G06F 30/398 |
| 2020/0225673 | A1* | 7/2020 | Ebrahimi Afrouzi | A47L 11/4011 |
| 2020/0324409 | A1* | 10/2020 | Gonzalez Aguirre | B25J 9/1661 |
| 2021/0125498 | A1* | 4/2021 | Munger | G08G 1/144 |
| 2021/0237595 | A1* | 8/2021 | Jung | G06Q 50/40 |
| 2022/0350994 | A1* | 11/2022 | Yang | B60W 30/06 |
| 2024/0029448 | A1* | 1/2024 | Li | G06V 10/44 |
| 2024/0336255 | A1* | 10/2024 | Hotta | B60W 30/06 |
| 2024/0362572 | A1* | 10/2024 | Arora | G06Q 10/08 |
| 2024/0367676 | A1* | 11/2024 | Xiao | B60W 60/001 |

FOREIGN PATENT DOCUMENTS

| | | |
|---|---|---|
| KR | 10-2017-0135167 | 12/2017 |
| KR | 10-2046147 | 11/2019 |

* cited by examiner

FIG. 5B

540

EXTRACT ALL CONTOURS
IN HIERARCHY STRUCTURE

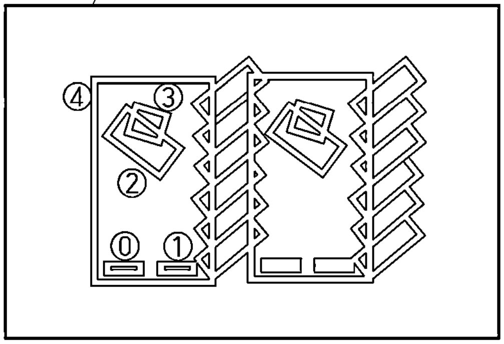

array (⓪[ 1, -1, -1, 4],
①[ -1, 0, -1, 4],
②[ 3, -1, -1, 4],
③[ -1, -2, -1, 4],
④[ -1, -1, 3, -1] ] )

EXTRACT ARRAY HAVING [NEXT CONTOUR, PREVIOUS CONTOUR, INNER CONTOUR, AND OUTER CONTOUR] STRUCTURE, NEXT CONTOUR OF CONTOUR NUMBER 0 IS 1 AND PREVIOUS OR INNER CONTOUR DOES NOT EXIST (EXPRESSED AS -1), OUTER CONTOUR IS 4

⇩

550

FILTER RECTANGLE IN SPECIFIC RANGE

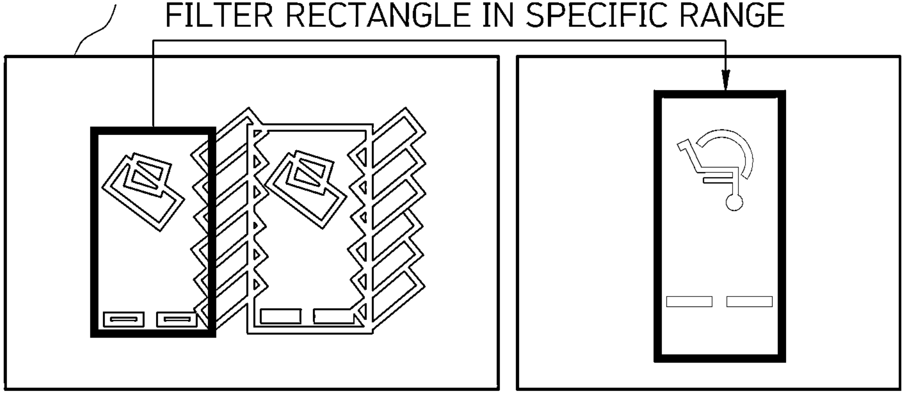

EXTRACT ONLY RECTANGLE INCLUDED IN SPECIFIC RANGE AND RECTANGLE THAT EXCEEDS OR FALLS BELOW SPECIFIC RANGE IS NOT RECOGNIZED

SYSTEM AND METHOD FOR GENERATING SMART MAP

CROSS-REFERENCE TO RELATED APPLICATION

This application claims priority to and the benefit of Korean Patent Application No. 10-2023-0126747, filed on Sep. 22, 2023, the disclosure of which is incorporated herein by reference in its entirety.

BACKGROUND

1. Technical Field

The present disclosure relates to system and method for generating a smart map, and more particularly, to a technology of generating a smart map through a process of automatically extracting various element data from an unstructured map.

2. Related Art

Existing map work is mainly done using CAD software or by allowing people to draw maps manually. In the case of such unstructured maps, extracting and utilizing various element data displayed on the maps has the disadvantage of being cumbersome and time-consuming.

For example, when an unstructured map is a parking lot map, since a parking surface, entry/exit area, or the like may be displayed in various forms depending on the drawing style of a map creator, there is a disadvantage in that many errors may occur when a computer recognizes the displayed parking surface and entry/exit area as element data in the parking lot and a lot of learning data are required even though an artificial intelligence model is used.

In the case of one parking lot with a small number of parking surfaces, element data can be sufficiently extracted manually. However, recently, the sizes, shapes, or the like of buildings have become more diverse, and parking lots generally include a plurality of floors rather than a single floor. When the parking lot is expanded and applied to numerous buildings to generate smart maps, it may not be possible for people to manually extract element data one by one.

Korean Patent Application Laid-Open No. 10-2012-0072124 (published on Jul. 3, 2012)

SUMMARY

Various embodiments are directed to providing system and method for generating a smart map, which can selectively apply and utilize various types of element data on an unstructured map by repeatedly performing a process of automatically extracting and subtracting a plurality of element data from the unstructured map.

However, the problems to be solved by the present disclosure are not limited to the above-described problems, and other problems may be present.

In order to solve the above-described problems, a method for generating a smart map based on unstructured map element extraction in accordance with a first aspect of the present disclosure includes: receiving a pre-prepared unstructured map; extracting and subtracting at least one target element data among a plurality of element data included in the unstructured map; and constructing a smart map based on the extracted and subtracted element data when the extracting and subtracting of the target element data from the unstructured map is completed In some embodiments of the present disclosure, the extracting and subtracting of the at least one target element data among the plurality of element data included in the unstructured map may include: extracting first element data from the plurality of element data included in the unstructured map; subtracting the extracted first element data from the unstructured map; extracting second element data from the unstructured map from which the first element data has been subtracted; and subtracting the extracted second element data from the unstructured map.

In some embodiments of the present disclosure, the extracting of the first element data from the plurality of element data included in the unstructured map may include: extracting a parking surface of the plurality of element data as first element data; recognizing element data of a predetermined shape on the unstructured map and extracting contours; and extracting a contour satisfying a preset range among the extracted contours as the parking surface.

In some embodiments of the present disclosure, the recognizing of the element data of a predetermined shape on the unstructured map and the extracting of the contours may include: extracting a contour having a predetermined shape from a predetermined area on the unstructured map; sorting a plurality of contour extraction results within the predetermined area on a hierarchical basis; and setting relationship information between inner and outer contours of the sorted contour extraction results.

In some embodiments of the present disclosure, the extracting of the contour satisfying the preset range among the extracted contours as the parking surface may include extracting an inner contour existing in the contour satisfying the preset range.

In some embodiments of the present disclosure, in the extracting of the contour satisfying the preset range among the extracted contours as the parking surface, when a length or a size of an area of discontinuous pixels among pixels constituting the contour satisfying the preset range is less than a reference pixel length or size, the contour may be extracted as the parking surface.

In some embodiments of the present disclosure, the extracting and subtracting of the at least one target element data among the plurality of element data included in the unstructured map may further include extracting a parking surface among the plurality of element data as first element data and extracting third element data that is not prominent on the unstructured map based on the extracted first element data.

In some embodiments of the present disclosure, the extracting of the third element data may include: extracting at least one line segment having a first direction and a certain length and area or more on the unstructured map from which the parking surface has been extracted; extracting at least one line segment having a second direction different from the first direction and a certain length and area or more on the unstructured map; setting an intersection point between the line segments having the first and second directions as a node; and extracting a combined state of the line segment and a node as the third element data being a road in a parking lot.

In some embodiments of the present disclosure, the extracting of the third element data may include grouping at least one parking surface located within a predetermined interval and satisfying at least one of predetermined structure conditions among parking surfaces extracted from the unstructured map.

A system for generating a smart map in accordance with a second aspect of the present disclosure includes: a communication module configured to receive a pre-prepared unstructured map; a memory configured to store a program for generating the smart map by extracting element data from the unstructured map; and a processor configured to execute the program stored in the memory, thereby extracting and subtracting at least one target element data among a plurality of element data included in the unstructured map and generating a smart map based on the extracted element data when the extracting and subtracting of the target element data from the unstructured map is completed.

In addition, a computer program according to another aspect of the present disclosure is combined with a computer as hardware to execute the method for generating a smart map, and is stored in a computer-readable recording medium.

Other specific details of the present disclosure are included in the detailed description and drawings.

The present disclosure described above can automate the extraction of element data, which was previously performed manually. Through this, work time and costs can be reduced, and errors caused by frequent mistakes or subjective interpretations that occur during manual work can be minimized.

In addition, there is an advantage in that the consistency of extracted element data can be guaranteed and the extracted element data can be managed by being provided with accurate location and attribute information.

In addition, since element data extracted from a smart map exists in a digital form, it can be utilized in connection with various computer-based systems. For example, by using parking surface information in a parking lot map, parking areas can be automatically allocated, the number of vehicles that can be accommodated in the parking surface can be calculated, necessary information can be provided to autonomous vehicles, or graphicalized necessary information can be output to other users or managers.

Moreover, a smart map managed in a digital form by extracting element data can be easily modified and updated compared to an unstructured map.

The effects of the present disclosure are not limited to the above-mentioned effects, and the other effects which are not mentioned herein will be clearly understood from the following descriptions by those skilled in the art.

BRIEF DESCRIPTION OF THE DRAWINGS

FIGS. 5A and 5B are diagrams for explaining a process of extracting parking surface element data in an embodiment of the present disclosure.

DETAILED DESCRIPTION

Figure 1:
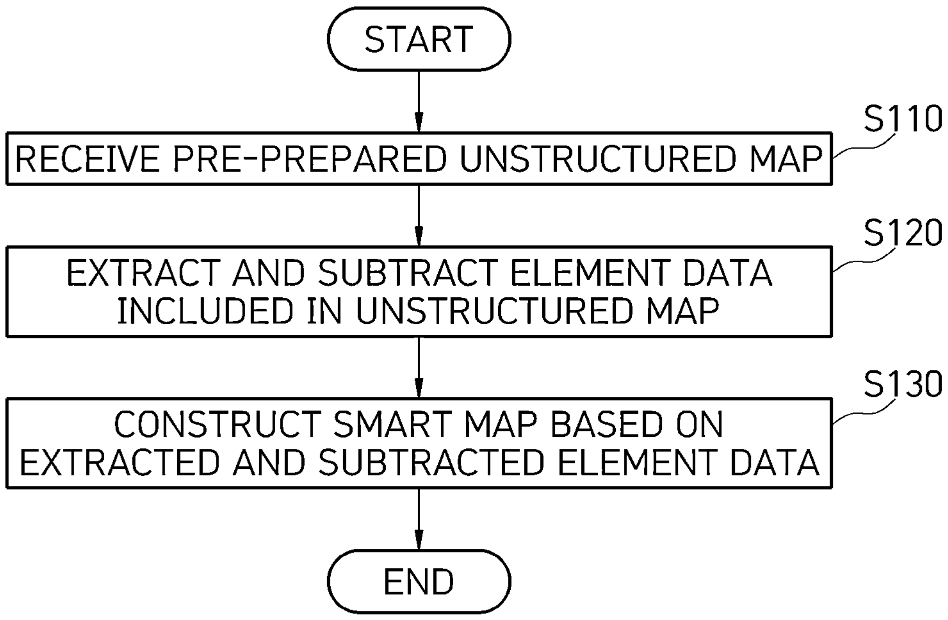
FIG. 1 is a flowchart of a method for generating a smart map based on an unstructured map element extraction in accordance with an embodiment of the present disclosure.

The advantages and characteristics of the present disclosure and a method for achieving the advantages and characteristics will be clearly understood through embodiments to be described in detail together with the accompanying drawings. However, the present disclosure is not limited to the following embodiments, but may be implemented in various forms different from each other, and the present embodiments are provided to bring the disclosure of the present disclosure to perfection and assist those skilled in the art to completely understand the scope of the present disclosure. Therefore, the present disclosure is defined only by the scope of the appended claims.

Terms used in the present specification are used for describing embodiments, not limiting the present disclosure. The terms of a singular form in the present specification may include plural forms unless specifically mentioned. The meaning of "comprise" and "comprising" used in the specification does not exclude the presence or addition of one or more other components in addition to the mentioned components. Throughout the specification, like reference numerals represent the same components, and the term "and/or" includes each of mentioned components and one or more combinations thereof. Although terms "first" and "second" are used to describe various components, the components are not limited by the terms. The terms are used only to distinguish one component from another component. Therefore, a first component described below may be a second component within the technical idea of the present disclosure.

Unless defined differently, all terms (including technical and scientific terms) used in this specification may be used as meanings which may be commonly understood by those skilled in the art to which the present disclosure pertains. Furthermore, terms which are defined in generally used dictionaries are not ideally or excessively construed unless clearly and specifically defined.

Hereinafter, a method for generating a smart map based on an unstructured map element extraction in accordance with an embodiment of the present disclosure is described with reference to FIGS. 1, 2, 3, 4A, 4B, 5A, 5B, 6A, 6B, 6C, 7, 8, 9A, and 9B.

FIG. 1 is a flowchart of a method for generating a smart map based on an unstructured map in accordance with an embodiment of the present disclosure. Each step illustrated in FIG. 1 may be understood as being performed by a system 1000 for generating a smart map based on an unstructured map to be described below, but is not necessarily limited thereto.

First, a pre-prepared unstructured map is received (S110).

Figure 2:
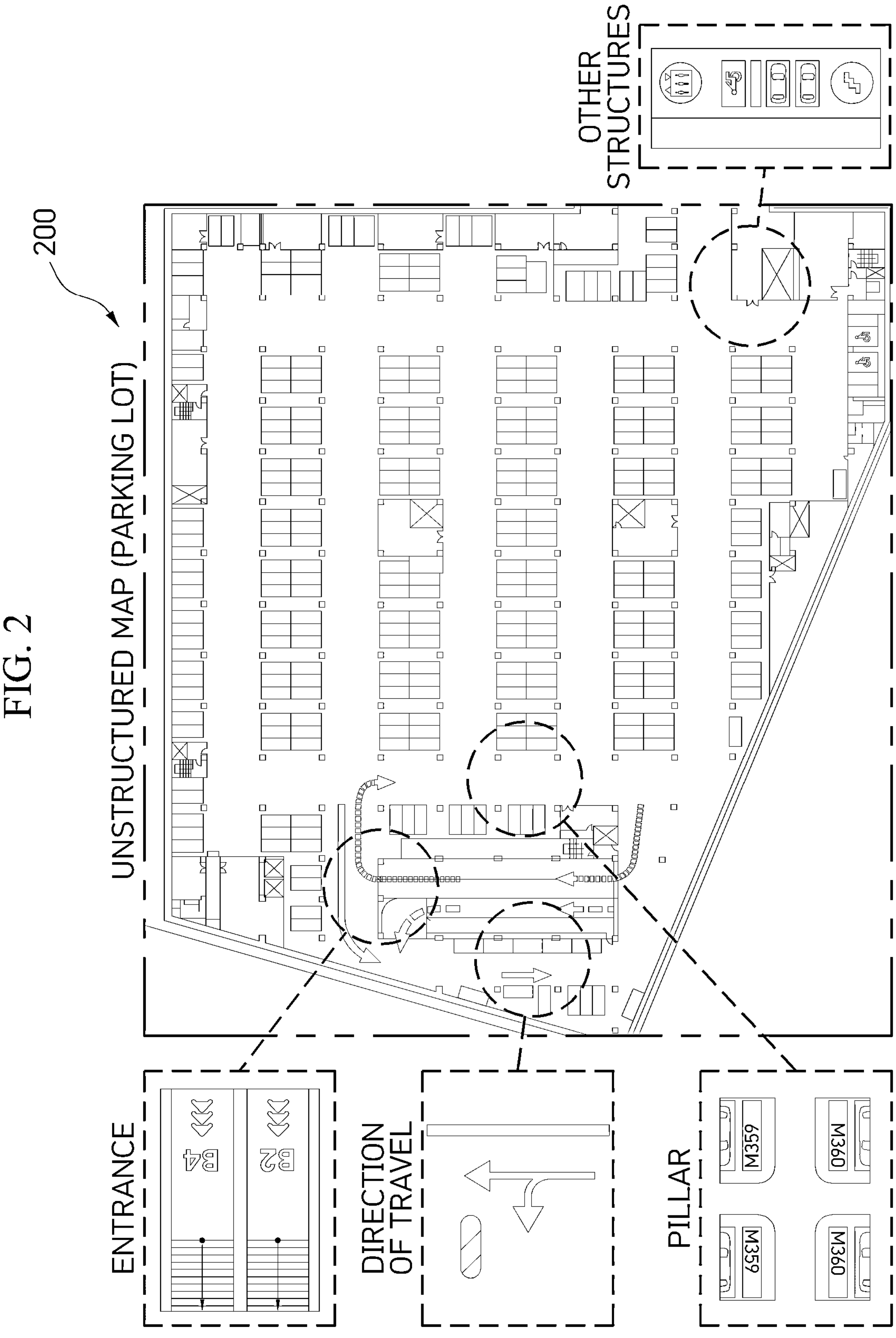
FIG. 2 is a diagram illustrating an example of an unstructured map in an embodiment of the present disclosure.

FIG. 2 is a diagram illustrating an example of an unstructured map 200 in an embodiment of the present disclosure.

In the case of the unstructured map 200 generated through CAD or human manual work, since numerous types of element data are mixed, it was difficult for a computer to understand and utilize various element data on the unstructured map 200. In particular, an expression method, a grouping method, or the like in the unstructured map 200 vary depending on a production company such as a contractor or a construction company, making it very difficult to standardize the unstructured map 200.

In addition, since the unstructured map 200 exists in the form of a paper or a file, there are difficulties in sharing information or collaboration between various devices, and it is not also possible for multiple users to access and utilize the unstructured map 200 at the same time.

In addition, when modifying or updating the map, since all changes need be reflected manually and the unstructured map 200 includes only visual information, defining relationships or attribute information between elements is not possible and there are limitations in additional data analysis or automated processing.

In order to solve such problems, an embodiment of the present disclosure aims to convert input unstructured data into a smart map. On the other hand, in the description of the present disclosure, the unstructured map 200 is described as a parking lot map.

Subsequently, at least one target element data among the plurality of element data included in the unstructured map 200 is extracted and subtracted (S120).

Figure 3:
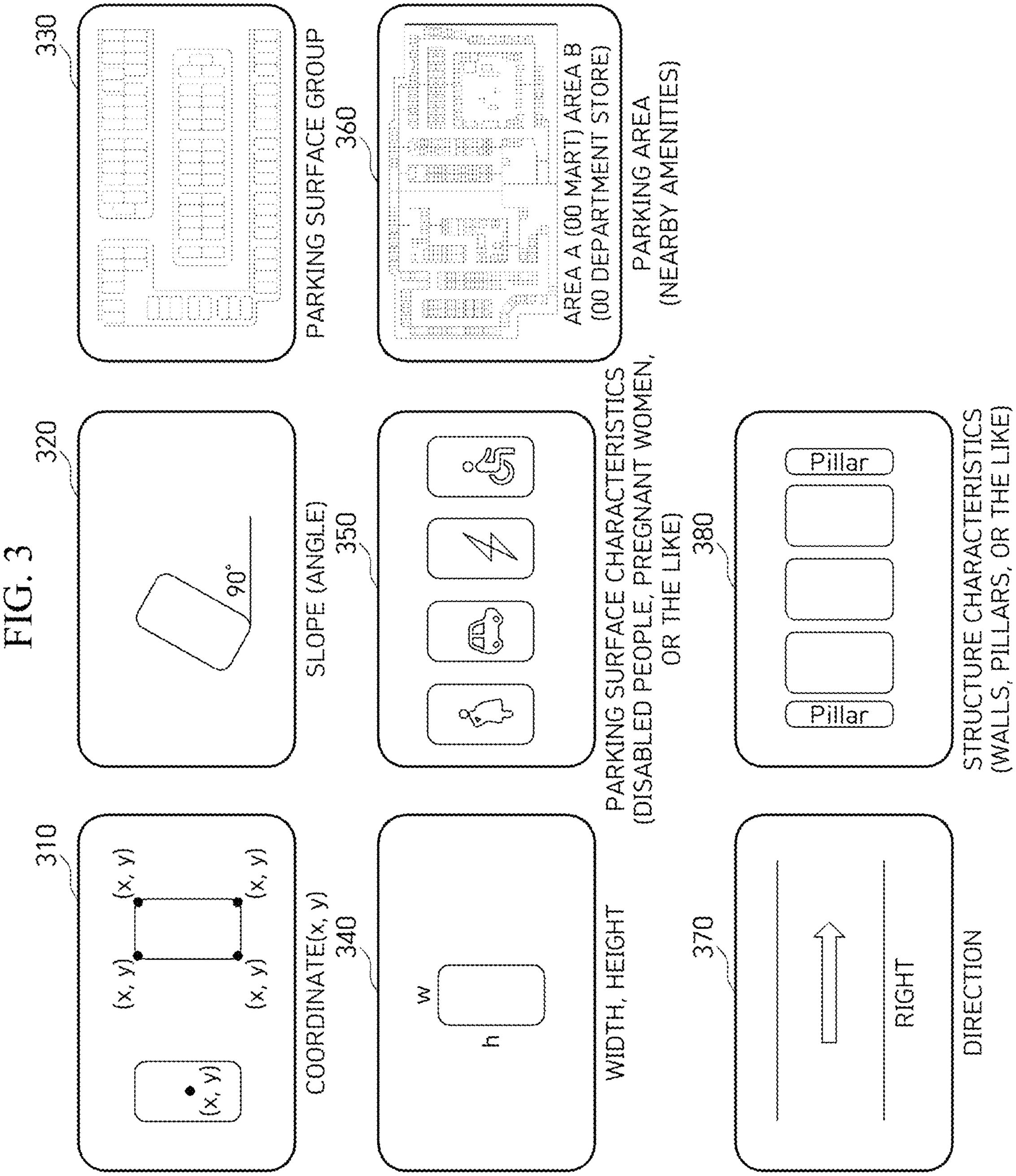
FIG. 3 is a diagram illustrating examples of element data in accordance with an embodiment of the present disclosure.

FIG. 3 is a diagram illustrating examples of element data in accordance with an embodiment of the present disclosure.

In an embodiment of the present disclosure, element data to be extracted refers to an element marked with a specific symbol, a mark, or other identifier on the unstructured map. As an example, as illustrated in FIG. 3, target element data that can be extracted in a parking lot map may include a parking surface and a road (coordinates 310, angle 320, width/height 340, or the like), parking surface characteristics 350, a parking surface group 330, a parking area 360, a road movement direction 370, structure characteristics 380 (walls, pillars, or the like), and various elements may be extracted as element data depending on the type of map.

Figure 4A:
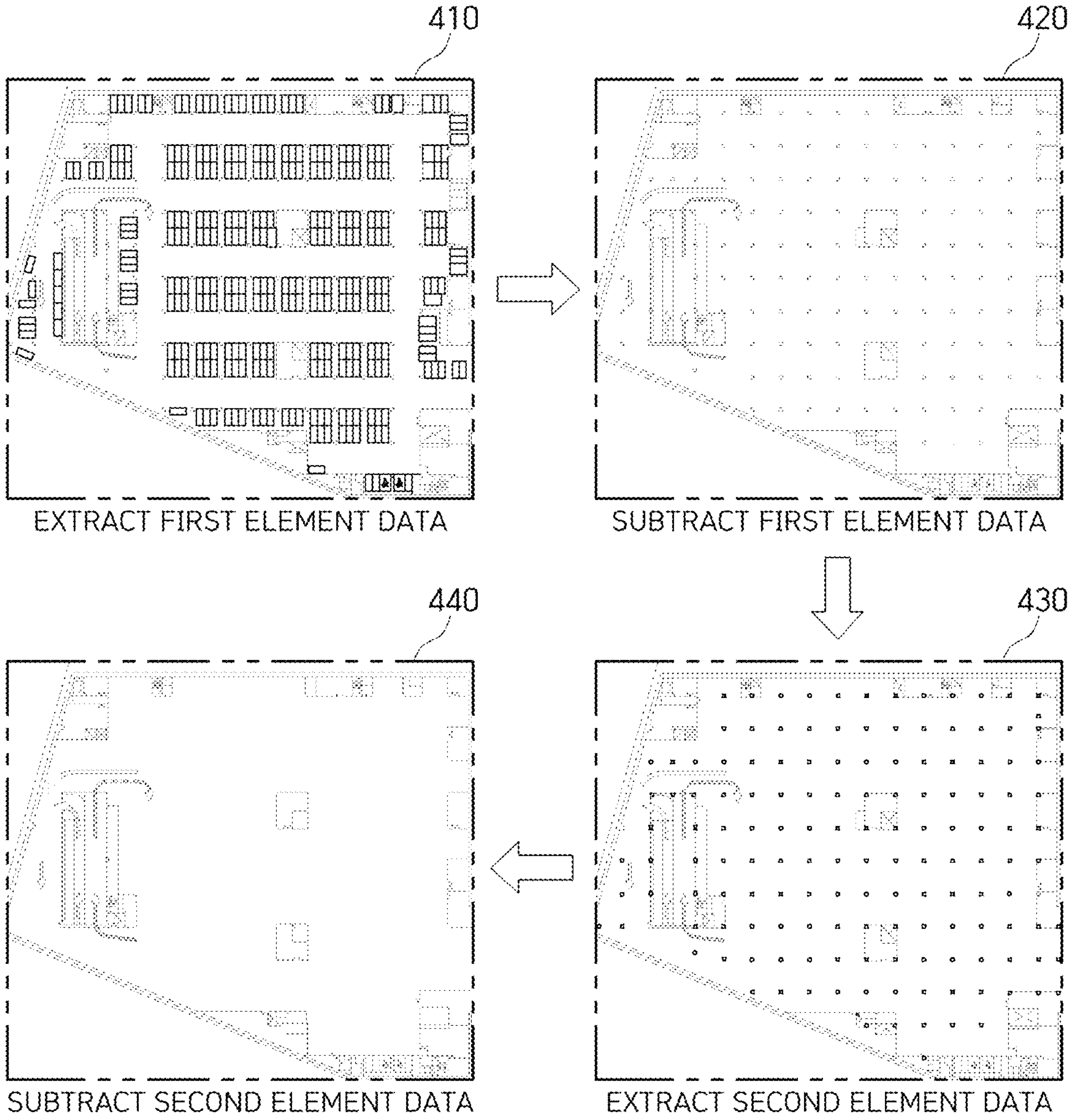
FIGS. 4A and 4B are diagrams for explaining a process of extracting and subtracting a plurality of element data in an embodiment of the present disclosure.
Figure 4B:
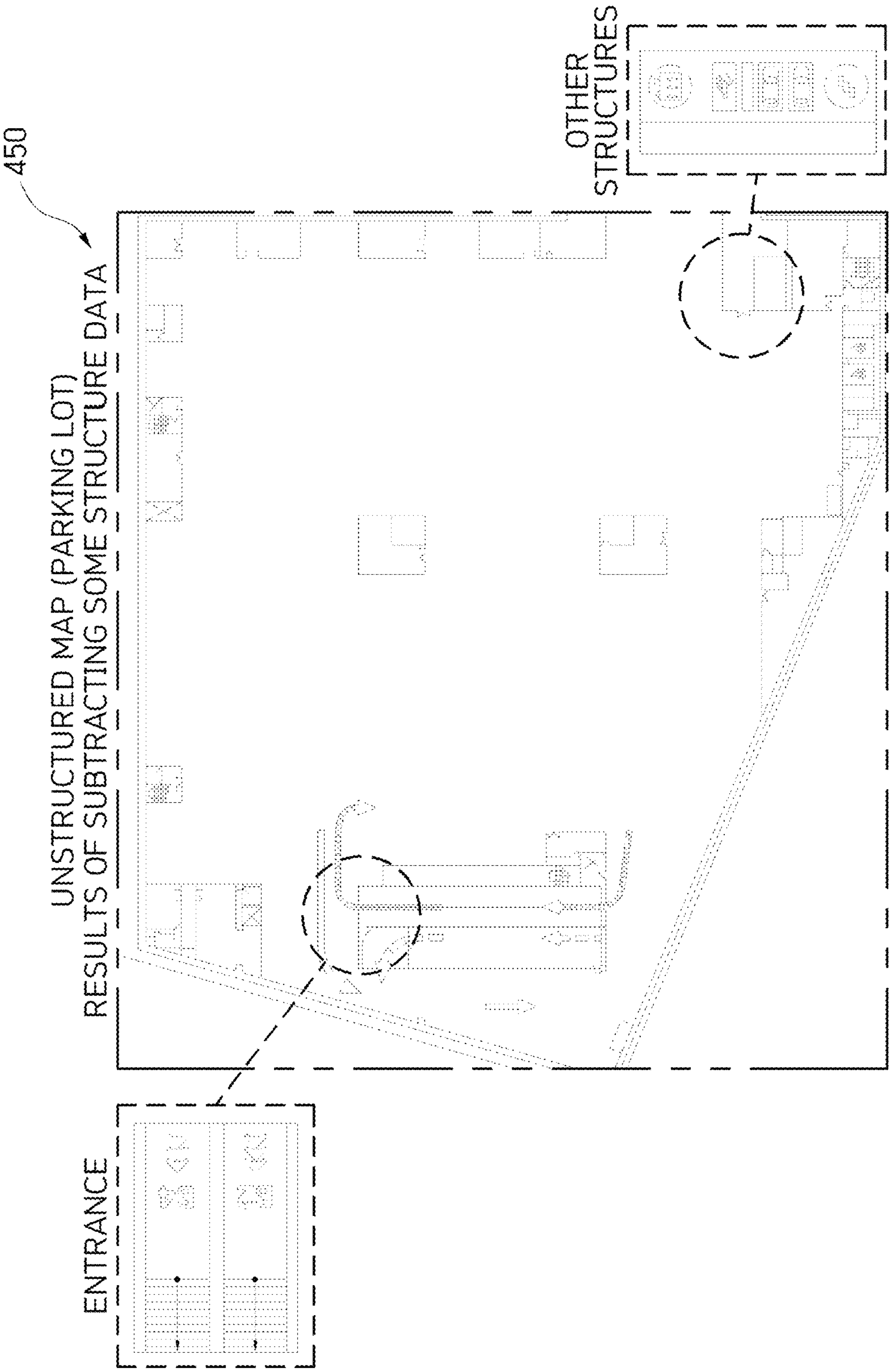

FIGS. 4A and 4B are diagrams for explaining a process of extracting and subtracting a plurality of element data in an embodiment of the present disclosure.

In an embodiment of the present disclosure, a process of extracting and subtracting a plurality of element data from the unstructured map may be automatically performed by using an image processing technology, a pattern recognition algorithm, object recognition artificial intelligence, or the like.

In an embodiment, the present disclosure extracts first element data from the plurality of element data included in the unstructured map (410), and subtracts the extracted first element data from the unstructured map (420).

Subsequently, second element data is extracted from the unstructured map from which the first element data has been subtracted (430), and the extracted second element data is subtracted from the unstructured map (440).

In the description of the present disclosure, the first element data and the second element data are not limitedly interpreted to a specific order. That is, the first element data may be element data extracted initially, or may be element data extracted after extraction of at least one element data is completed. The second element data refers to element data extracted from the unstructured map from which the first element data has been subtracted after the first element data is extracted and subtracted. When a difference in characteristics between the first element data and the second element data is large, after the extraction of the first element data or simultaneously with this, the first element data subtraction process may be omitted and the second element data or a plurality of element data may be extracted.

In an embodiment of the present disclosure, the extraction order between element data may be determined according to predetermined conditions. As a condition, the extraction order of the element data may be determined based on the number, complexity, and total area of element data existing on the unstructured map and having the same shape, shape, color, or the like. In such a case, a predetermined weight may be variably applied to the number and area.

Referring to FIGS. 4A and 4B, a parking surface among a plurality of element data is first extracted from the unstructured map. When the extraction of the parking surface is completed, the parking surface element data extracted from the unstructured map is subtracted. When the parking surface element data is subtracted from the unstructured map, the map is further simplified, and thus a computer can quickly recognize (extract) a next element with fewer resources and with fewer errors.

Pillars are extracted and subtracted as the second element data from the unstructured map from which the parking surface element data has been subtracted. A smart map 450 may be generated by repeating such a process as many times as necessary or a preset number of times. The preset number of times may match the number of element data types.

Figure 5A:
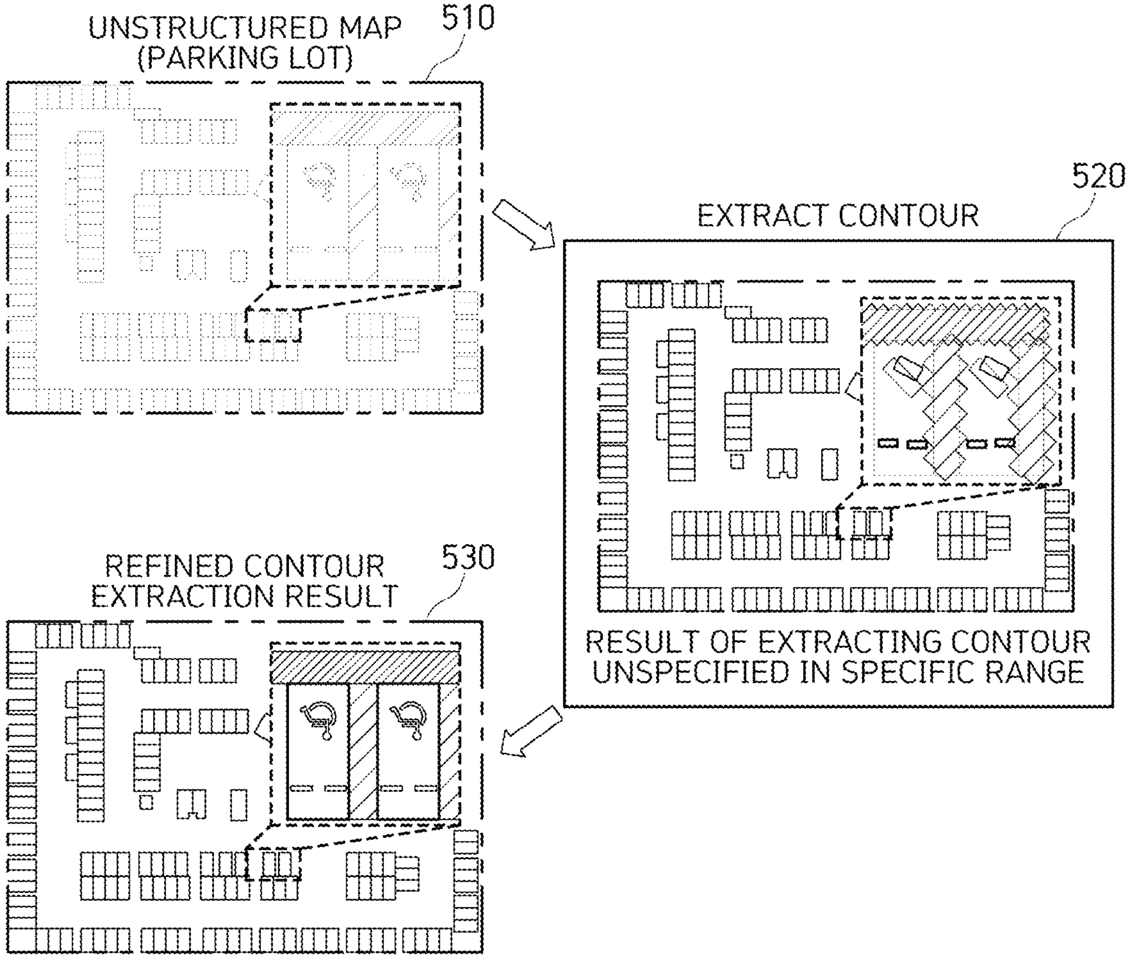

FIGS. 5A and 5B are diagrams for explaining a process of extracting parking surface element data in an embodiment of the present disclosure.

In the case of a parking lot, since a parking surface is the most numerous and important element, the first element data extracted first in an embodiment of the present disclosure may be the parking surface. Referring to FIG. 5A, in the case of a parking surface, contours for recognizing element data of a predetermined shape are extracted from an original unstructured map 510 (520), and a contour satisfying a preset range (size, shape, or the like) among the extracted contours may be extracted as a parking surface (530). In such a case, an embodiment of the present disclosure may use an algorithm for recognizing a plurality of contours rather than necessarily applying only a rectangular recognition algorithm. As an example, by using a contour-based recognition algorithm, a Hough transform algorithm, a template matching algorithm, and other deep learning-based algorithms, it is possible to recognize element data in various shapes such as polygons, circles, ovals, and straight lines. In the case of other elements other than the parking surface, the shape of a contour to be recognized is not necessarily limited to a rectangle.

With reference to FIG. 5B, the content of extracting the contour of the parking surface element is described in more detail. First, a contour of a predetermined shape is extracted from a predetermined area on the unstructured map (540). The predetermined area may be a window set to have a certain size. That is, an embodiment of the present disclosure may perform contour extraction on the entire area of the unstructured map, but since excessive computer resources are required, the entire unstructured map may be divided into predetermined areas to extract the contour. The predetermined area does not necessarily need to be set to be smaller than the unstructured map, and of course, it can be set to the entire area of the unstructured map depending on computer resources.

In the contour extraction process, an embodiment of the present disclosure may sort a plurality of contour extraction results within a predetermined area on a hierarchical basis according to a hierarchy structure. Subsequently, an embodiment of the present disclosure may set relationship information between inner and outer contours of the sorted contour extraction results.

As an example, the contour extraction results may be sorted according to size, which may be arranged in an array form. The array may be expressed as a [next contour, previous contour, inner contour, and outer contour] structure. For example, the next contour of contour number 0 is contour number 1, and since there are no previous or inner contours, it may be expressed as −1 and the outer contour corresponds to contour number 4.

When the contour extraction results are sorted in this way, the contour satisfying the preset range among the extracted contours is set as the parking surface (550). In the example of FIG. 5B, rectangles included in a specific range are displayed to be differentiated, and rectangles not satisfying the specific range are not recognized separately.

In the above-described example, the present disclosure extracts element data included in a predetermined area window, and in this process, all target element data may be first extracted from a first predetermined area. Subsequently, element data identical to the element data extracted from the first predetermined area is extracted from remaining n−1 predetermined areas excluding the first predetermined area.

Subsequently, when it is determined whether unextracted element data exists in a second predetermined area and the unextracted element data exists, the unextracted element data is additionally extracted from n−2 predetermined areas.

By performing such a process up to an $n^{th}$ predetermined area, the present disclosure has the advantage of being able to more quickly extract element data from the entire area of the unstructured map.

Figure 6A:
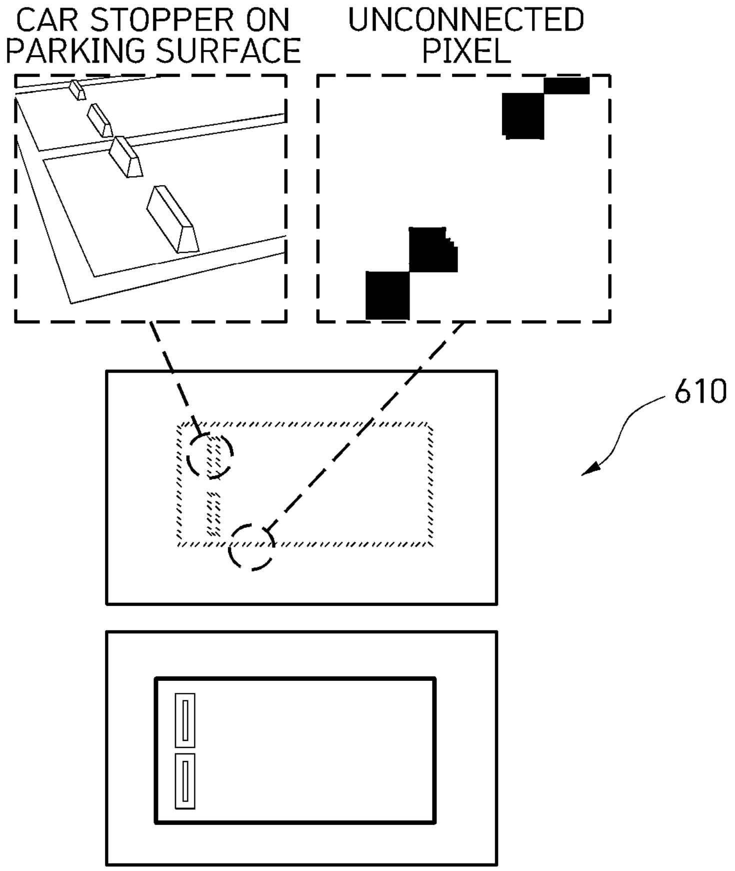
FIGS. 6A to 6C are diagrams for explaining additional information applicable when extracting element data in an embodiment of the present disclosure.
Figure 6B:
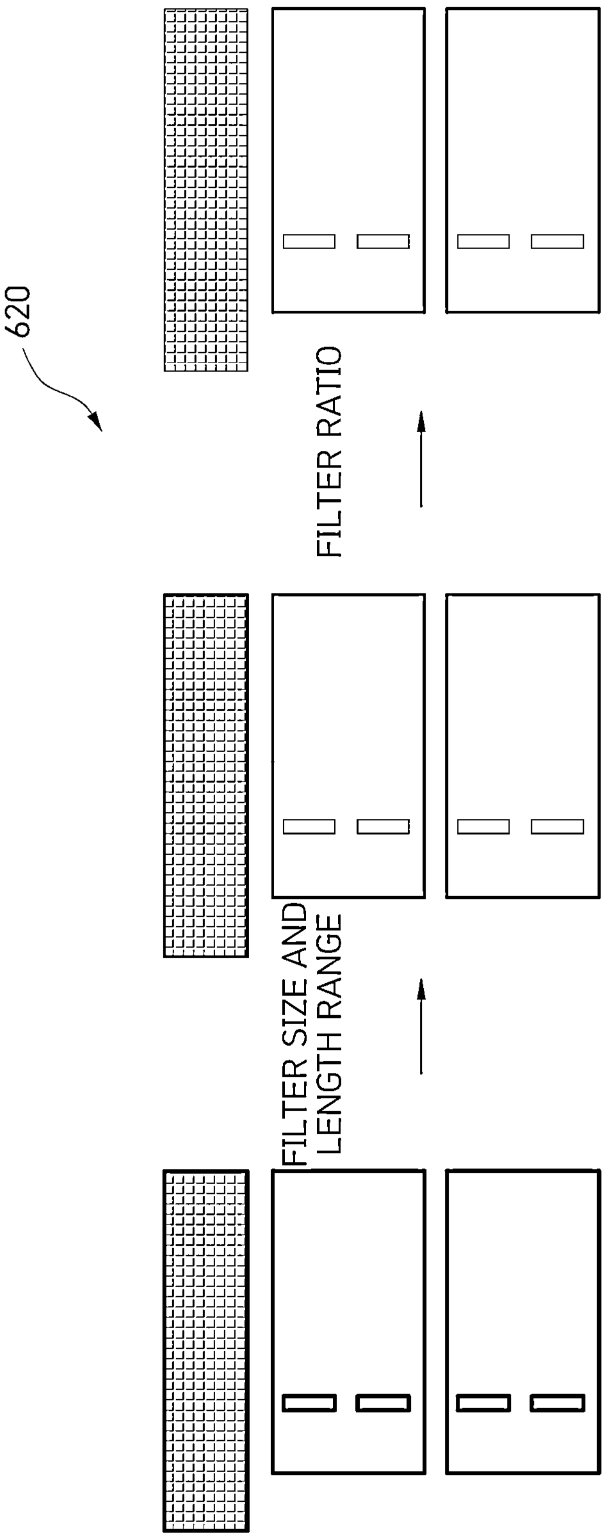
Figure 6C:
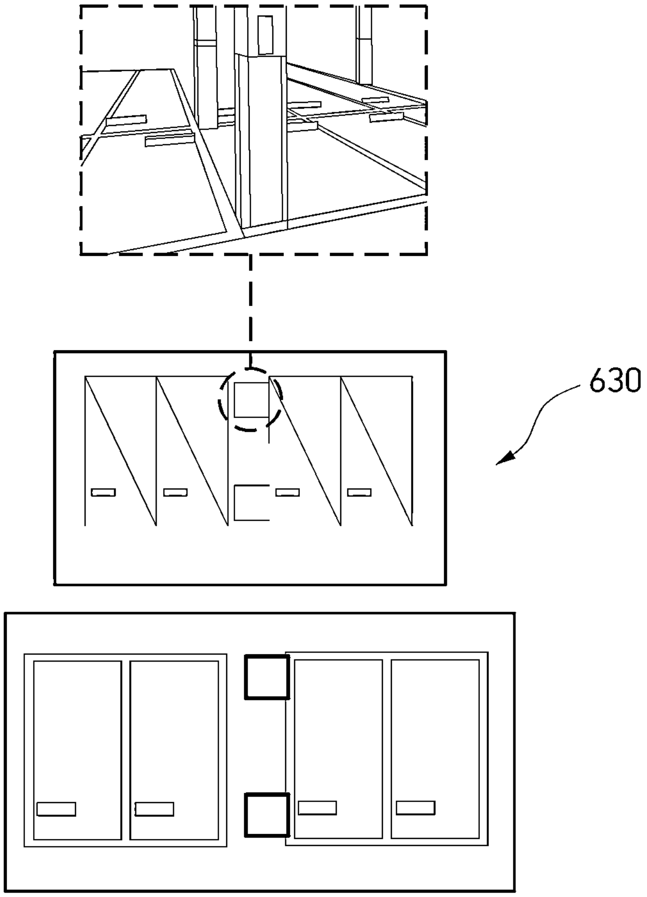

In addition, an embodiment of the present disclosure may further use additional information in order to further improve the recognition accuracy of element data. FIGS. 6A to 6C are diagrams for explaining additional information applicable when extracting element data in an embodiment of the present disclosure.

Referring to FIG. 6A, an embodiment of the present disclosure first extracts inner contours within the contour satisfying the preset range in order to extract a parking surface in the contour extraction process. When there is an inner contour having a size range corresponding to a car stopper constructed in the parking surface among the inner contours, the contour satisfying the preset range may be extracted as the parking surface.

In addition, an embodiment of the present disclosure may determine whether an area of discontinuous pixels exists among pixels constituting a contour satisfying predetermined form element conditions and simultaneously satisfying the preset range, and extract a contour corresponding to the preset range as a parking surface when the size of the area of the discontinuous pixels is less than a reference pixel size in a case where the area of the discontinuous pixels exists (610). The discontinuous pixels may be converted into a contour of continuous pixels approximated to a predetermined shape element, and finally the contour may be extracted as a parking surface.

In addition, in an embodiment of the present disclosure, when there are a plurality of contours satisfying a preset length or size range as illustrated in FIG. 6B, a parking surface may be recognized by further considering ratio information of a rectangle (620).

Moreover, in an embodiment of the present disclosure, when a parking surface is extracted and subtracted as the first element data as illustrated in FIG. 6C and then a pillar is extracted as the second element data, in order to more accurately recognize whether the extracted pillar is a pillar, a rectangular contour existing between the parking surface extracted as the element data and a parking surface may be extracted as pillar element data (630).

In this way, an embodiment of the present disclosure can improve the efficiency and accuracy of element data extraction work by using various additional information in the process of extracting and fixing element data. That is, an embodiment of the present disclosure has the advantage in that parking surfaces, pillars, or the like can be accurately extracted as element data through additional information, automation is possible, and consistency and reliability can be improved in the element data extraction process.

Figure 7:
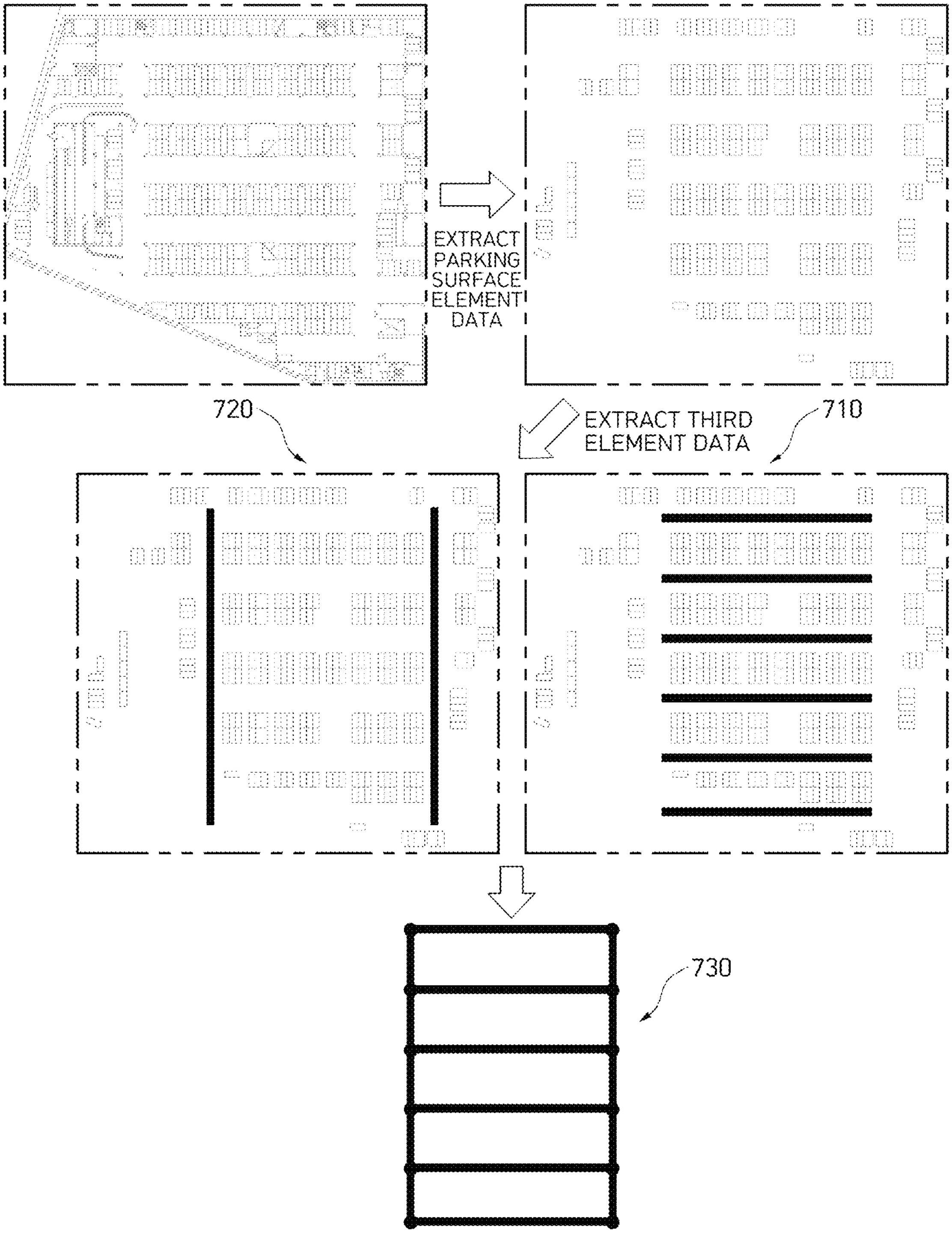
FIG. 7 is a diagram for explaining a process of extracting element data that is not prominent on an unstructured map in an embodiment of the present disclosure.
Figure 8:
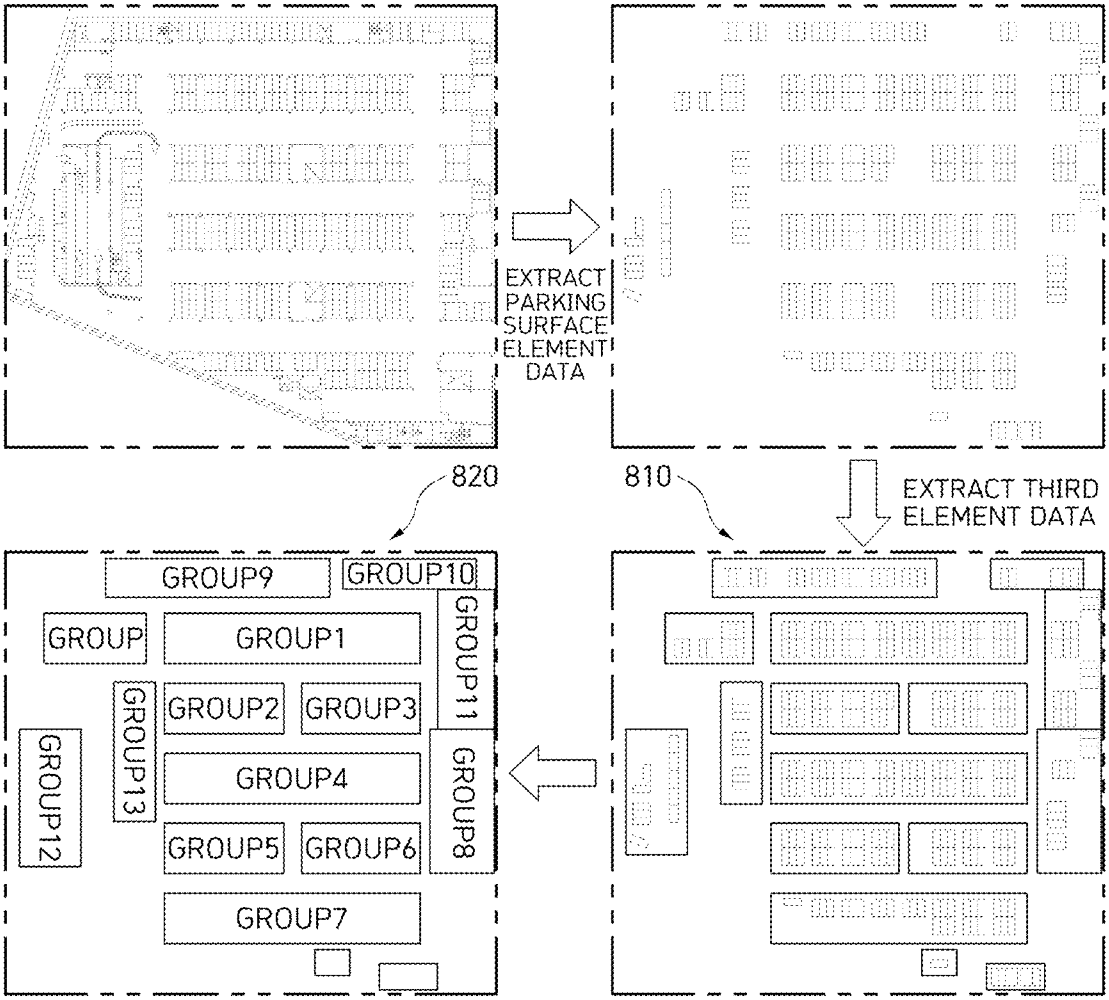
FIG. 8 is a diagram for explaining a process of extracting element data (parking surface group) that is not prominent on an unstructured map in an embodiment of the present disclosure.

FIG. 7 is a diagram for explaining a process of extracting element data (road) that is not prominent on an unstructured map in an embodiment of the present disclosure. FIG. 8 is a diagram for explaining a process of extracting element data (parking surface group) that is not prominent on an unstructured map in an embodiment of the present disclosure.

When the unstructured map is a parking lot, it is natural that parking surfaces need be accurately prominent within the parking lot, but a road for movement to the parking surface is not separately prominent in most cases. In this case, it is natural for a person to recognize a place with a width corresponding to the size of a vehicle between the parking surfaces as a road (or vehicle passage) in the parking lot, but since the road has not been prominent, a computer is not able to recognize the road as element data.

Accordingly, in an embodiment of the present disclosure, after a parking surface among a plurality of element data is extracted as the first element data, third element data that is not prominent on the unstructured map can be extracted based on the extracted first element data.

Specifically, in order to extract the road in the parking lot as the third element data, an embodiment of the present disclosure extracts at least one line segment having a first direction and a certain length and area or more on the unstructured map from which the parking surface has been extracted (710). Subsequently, an embodiment of the present disclosure extracts at least one line segment having a second direction different from the first direction and a certain length and area or more on the unstructured map (720). In the example of FIG. 7, six line segments having a horizontal direction as the first direction and a certain length and area are first extracted, and two line segments having a vertical direction as the second direction and a certain length and area are extracted. The extracted line segments are marked to be distinguished through hatching. In the case of the line segment extraction process, various conditions in addition to the length and area may be used for the extracted line segments as needed.

Subsequently, after an intersection point between the extracted line segments having the first and second directions is set as a node 730-1, a combined state of the line segment and a node 730-2 may be extracted as the third element data being a road 730-2 in the parking lot (730).

In this way, in an embodiment of the present disclosure, a smart map can be constructed by extracting a parking surface as element data and then extracting a road, which is an element not prominent in a parking lot, as element data based on the extracted parking surface element data. This allows a computer to recognize the road in the parking lot even in a non-prominent area, and can provide the advantage of being able to accurately distinguish between the road and the parking surface.

Referring to FIG. 8, in an embodiment of the present disclosure, in order to extract a group of parking surfaces in the parking lot as the third element data, at least one parking surface within a predetermined interval among the parking surfaces extracted from the unstructured map may be grouped (810). Together with or separately from this, at least one parking surface satisfying predetermined structure conditions may be grouped. The predetermined structure condition may be element data extracted from the unstructured map, and for example, refers to the location conditions of pillars, access roads, roads, or the like.

This is a process of grouping adjacent parking surfaces on the unstructured map into one group, and the grouped parking surfaces refer to parking surfaces connected to or adjacent to each other. By extracting the parking surface group as element data, an embodiment of the present disclosure can improve user convenience. That is, the embodiment of the present disclosure has the advantage in that users are able to easily identify parking surface groups within the parking lot and quickly check and understand the structure and layout of a parking space through each group. This can provide high efficiency such as calling of a parking space according to groups, for example a parking space between pillar A and pillar B or a parking space right in front of an escalator entrance when parking lot users or drivers select or move to a parking space.

In addition, the parking surface groups may be displayed to be clearly distinguished from the road in the parking lot on an application program GUI, so that users can clearly distinguish vehicle movement and parking routes. In addition, the UX/UI visibility of the smart map can be improved through the parking surface groups (820). The parking surface groups are managed with different group IDs as needed, and each group can be differentiated by colors, patterns, labels, or the like. Through differentiated colors, patterns, and labels, users are able to quickly understand parking lot maps and easily ascertain necessary information.

Subsequently, when the extraction and subtraction of target element data from the unstructured map is completed, the smart map is constructed based on the extracted element data (S130).

Figure 9A:
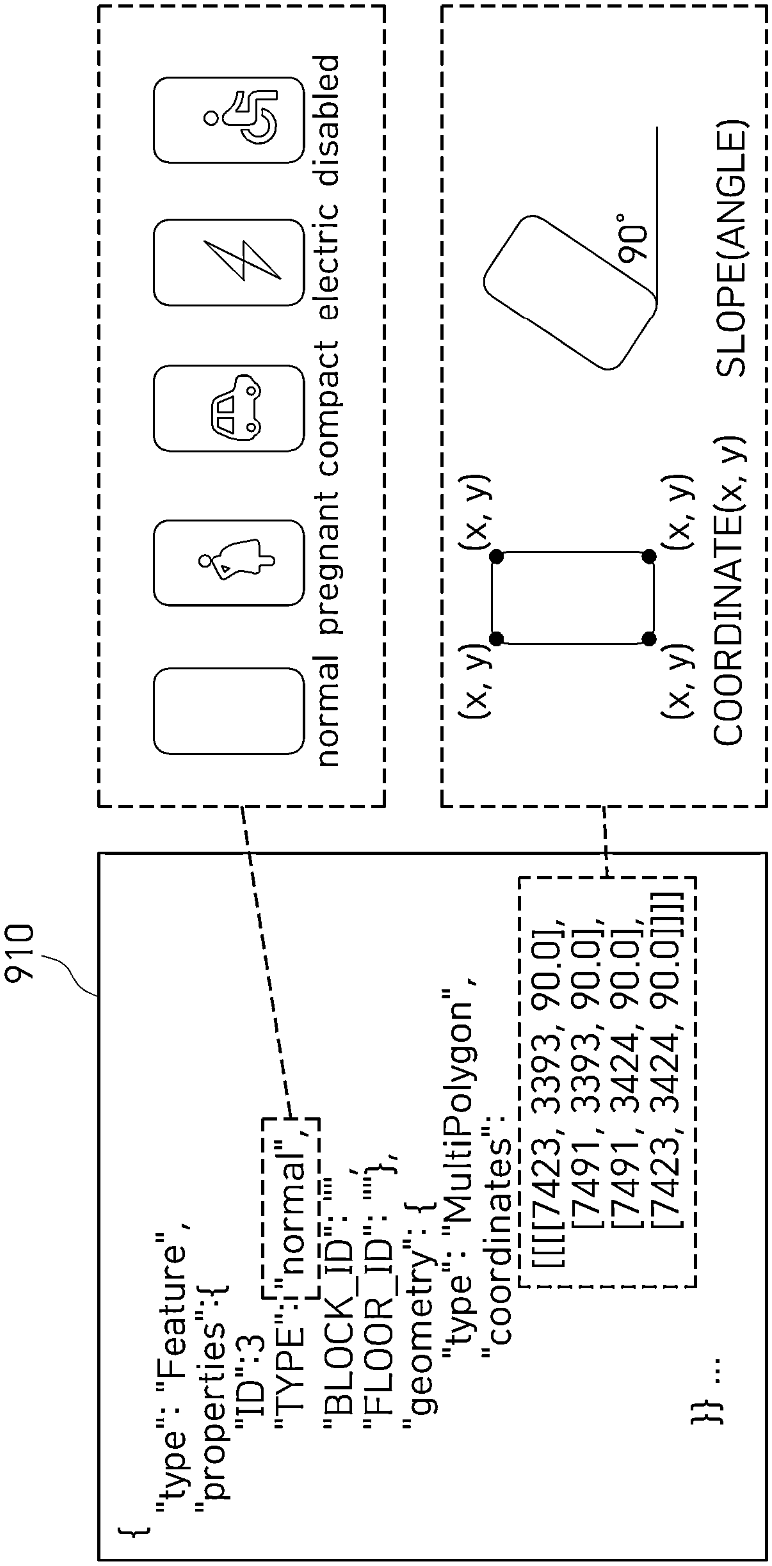
FIGS. 9A and 9B are diagrams for explaining a smart map generated in an embodiment of the present disclosure.
Figure 9B:
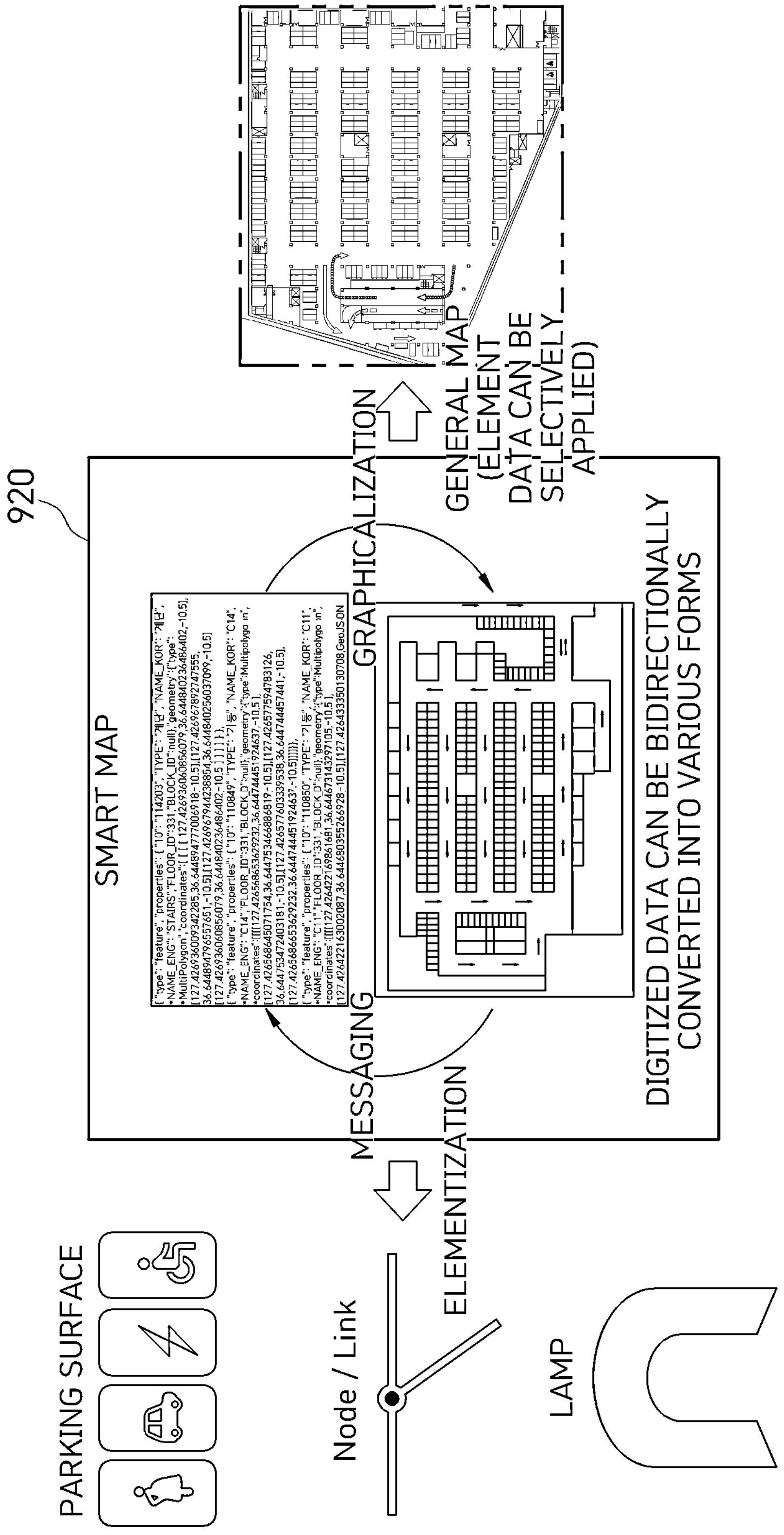

FIGS. 9A and 9B are diagrams for explaining a smart map generated in an embodiment of the present disclosure.

The construction of the smart map is completed by repeating the process of extracting and subtracting element data from the unstructured map. The smart map includes various extracted element data and can accurately express information such as location, size, and attributes for each element data.

When the extraction of the element data is completed, the layout of the smart map may be constructed using the extracted element data, and the smart map may be made to include other necessary additional information or functions. The smart map may exist in a digital form that is easy to modify and can provide various functions, and may be integrated with other systems or applications as needed.

As an example, as illustrated in FIG. 9A, each element data may be managed in the form of a text message to include information such as ID, coordinates, and type (910), and as illustrated in FIG. 9B, the text message may be provided graphically as needed, and all or part of the element data may be selected on the graphical screen and then easily converted back into a text message (920). In principle, the text message is managed for each element data, but of course, the text message may also be managed in a form including all or part of each element data.

In the above description, steps S110, S120, and S130 may be further divided into additional steps or combined into fewer steps, depending on the implementation of the present disclosure. Some steps may also be omitted as needed or the order between the steps may also be changed. In addition, even in the case of other omitted content, the content of FIGS. 1, 2, 3, 4A, 4B, 5A, 5B, 6A, 6B, 6C, 7, 8, 9A, and 9B may also be applied to the content of the system 1000 for generating a smart map in FIG. 10 to be described below.

Figure 10:
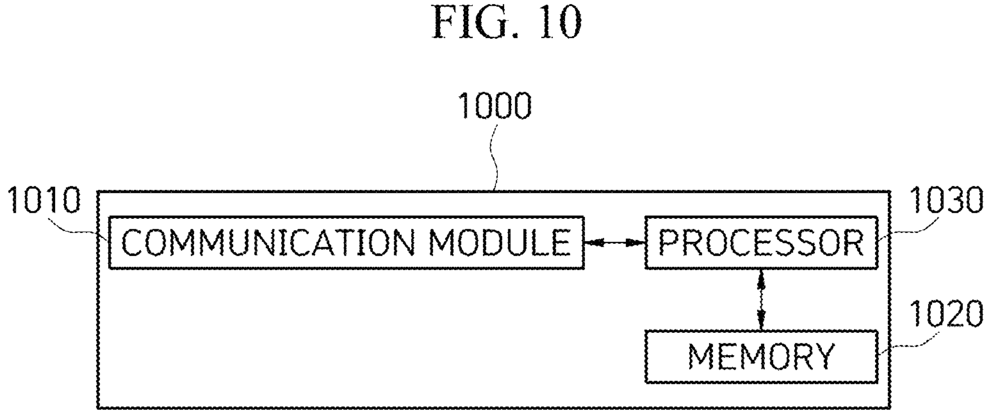
FIG. 10 is a block diagram of a system for generating a smart map in accordance with an embodiment of the present disclosure.

FIG. 10 is a block diagram of the system 1000 for generating a smart map in accordance with an embodiment of the present disclosure.

The system 1000 for generating a smart map in accordance with an embodiment of the present disclosure includes a communication module 1010, a memory 1020, and a processor 1030.

The communication module 1010 receives a pre-prepared unstructured map. Such a communication module 1010 may include both a wired communication module and a wireless communication module. The wired communication module may be implemented with a power line communication device, a telephone line communication device, a home cable MoCA, the Ethernet, an IEEE1294, an integrated wired home network, and an RS-485 control device. The wireless communication module may be implemented with a wireless LAN (WLAN), a Bluetooth, a HDR WPAN, a UWB, a ZigBee, an impulse radio, a 60 GHz WPAN, a binary-CDMA, a wireless USB technology, a wireless HDMI technology, or the like.

The memory 1020 stores a program for generating the smart map by extracting element data from the unstructured map, and the processor 1030 executes the program stored in the memory 1020.

The memory 1020 is a general term for volatile storage devices and nonvolatile storage devices that continuously retain stored information even though no power is supplied. For example, the memory 1020 may include a NAND flash memory such as a compact flash (CF) card, a secure digital (SD) card, a memory stick, a solid-state drive (SSD), and a micro SD card, a magnetic computer storage device such as a hard disk drive (HDD), and an optical disc drive such as a CD-ROM and a DVD-ROM.

The processor 1030 extracts and subtracts at least one target element data from a plurality of element data included in the unstructured map, and generates the smart map based on the extracted and subtracted element data when the extraction and subtraction of the target element data from the unstructured map is completed.

The method for generating the smart map in accordance with the embodiment of the present disclosure described above may be implemented with a program (or application) and stored in a medium, so as to be executed through a computer as hardware which is coupled thereto.

The above-described program may include codes written by a computer language such as C, C++, JAVA, Ruby, or machine language, which can be read by a processor (CPU) of the computer through a device interface of the computer, in order to execute the above-described methods which are implemented as a program read by the computer. Such codes may include a functional code related to a function defining functions required for executing the above-described methods, and include an execution procedure-related control code required for the processor of the computer to execute the functions according to a predetermined procedure. Furthermore, such codes may further include additional information required for the processor of the computer to execute the functions or a memory reference-related code indicating the position (address) of an internal or external memory of the computer, where a medium needs to be referred to. Furthermore, when the processor of the computer needs to communicate with another remote computer or server in order to execute the functions, the codes may further include communication-related codes indicating how to communicate with another remote computer or server by using a communication module of the computer and which information or media to transmit or receive during communication.

The stored medium does not indicate a medium such as a register, cache or memory, which stores data for a short moment, but indicates a medium which semi-permanently stores data and can be read by a device. Specifically, examples of the storage medium include a ROM, RAM, CD-ROM, magnetic tape, floppy disk, optical data storage device or the like, but are not limited thereto. That is, the program may be stored in various recording media on various servers which the computer can access or various recording media of a user's computer. Furthermore, the media may store codes which can be distributed in computer systems connected through a network, and read by computers in a distributed manner.

The descriptions of the present disclosure are only examples, and those skilled in the art to which the present disclosure pertains will understand that the present disclosure can be easily modified into other specific forms without changing the technical spirit or essential features of the present disclosure. Therefore, it should be understood that the above-described embodiments are only illustrative in all aspects and are not limitative. For example, components described in a singular form may be distributed and embodied. Similarly, distributed components may be embodied in a coupled form.

The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A method for generating a digital smart map performed by a computer, comprising:

receiving a digitized, pre-prepared unstructured map;

extracting and subtracting at least one target element data among a plurality of element data included in the unstructured map, wherein extracting and subtracting the at least one target element data among the plurality of element data included in the unstructured map comprises:

extracting first element data among the plurality of element data included in the unstructured map;

subtracting the extracted first element data from the unstructured map to generate a first modified version of the unstructured map that excludes the extracted first element data;

extracting second element data among the plurality of element data included in the first modified version of the unstructured map; and subtracting the extracted second element data from the first modified version of the unstructured map to generate a second modified version of the unstructured map that excludes both the extracted first element data and the extracted second element data; and constructing a digital smart map including features corresponding to the extracted and subtracted first and second element data when the extracting and subtracting the at least one target element data among the plurality of element data included in the unstructured map is completed.

2. The method for generating a digital smart map of claim 1, wherein the extracting the first element data among the plurality of element data included in the unstructured map extracts a parking surface among the plurality of element data as the first element data, and comprises:

recognizing element data of a predetermined shape on the unstructured map and extracting contours; and extracting a contour satisfying a preset range among the extracted contours as the parking surface.

3. The method for generating a digital smart map of claim 2, wherein the recognizing of the element data of a predetermined shape on the unstructured map and the extracting of the contours comprises:

extracting a contour having a predetermined shape from a predetermined area on the unstructured map;

sorting a plurality of contour extraction results within the predetermined area on a hierarchical basis; and setting relationship information between inner and outer contours of the sorted contour extraction results.

4. The method for generating a digital smart map of claim 2, wherein the extracting of the contour satisfying the preset range among the extracted contours as the parking surface comprises:

extracting an inner contour existing in the contour satisfying the preset range.

5. The method for generating a digital smart map of claim 2, wherein, in the extracting of the contour satisfying the preset range among the extracted contours as the parking surface, when a size of an area of discontinuous pixels among pixels constituting the contour satisfying the preset range is less than a reference pixel size, the contour or a predetermined approximated figure is extracted as the parking surface.

6. The method for generating a digital smart map of claim 1, wherein the extracting and subtracting the at least one target element data among the plurality of element data included in the unstructured map further comprises:

extracting a parking surface among the plurality of element data as the first element data and extracting other element data that is not prominent on the first modified version of the unstructured map as the second element data based on the extracted first element data.

7. The method for generating a digital smart map of claim 6, wherein the extracting the other element data comprises:

extracting at least one line segment having a first direction and a certain length and area or more on the first modified version of the unstructured map that excludes the parking surface;

extracting at least one line segment having a second direction different from the first direction and a certain length and area or more on the first modified version of the unstructured map;

setting an intersection point between the line segments having the first and second directions as a node; and extracting a combined state of the line segments and the node as the second element data and recognizing the second element data as a road in a parking lot.

8. The method for generating a digital smart map of claim 6, wherein the extracting of the other element data comprises:

grouping at least one parking surface located within a predetermined interval and satisfying at least one of predetermined structure conditions among parking surfaces extracted from the unstructured map.

9. The method for generating a digital smart map of claim 1, wherein constructing the digital smart map including features corresponding to the extracted and subtracted first and second element data comprises generating a hierarchical textual representation of at least one part of the digital smart map.

10. The method for generating a digital smart map of claim 9, wherein the information about the extracted and subtracted first and second element data comprises identifiers of the first and second element data, coordinates of the first and second element data, and types of the first and second element data.

11. The method for generating a digital smart map of claim 1, wherein constructing the digital smart map including features corresponding to the extracted and subtracted first and second element data comprises generating at least one text message including information about the extracted and subtracted first and second element data.

12. A system for generating a digital smart map, the system comprising:

a communication module configured to receive a digitized, pre-prepared unstructured map;

a memory configured to store a program for generating the digital smart map; and a processor configured to execute the program stored in the memory to cause the system to:

extract and subtract at least one target element data among a plurality of element data included in the unstructured map, the extraction and subtraction of the at least one target element data among the plurality of element data included in the unstructured map comprising:

extraction of first element data among the plurality of element data included in the unstructured map;

subtraction of the extracted first element data from the unstructured map to generate a first modified version of the unstructured map that excludes the extracted first element data;

extraction of second element data among the plurality of element data included in the first modified version of the unstructured map; and subtraction of the extracted second element data from the first modified version of the unstructured map to generate a second modified version of the unstructured map that excludes both the extracted first element data and the extracted second element data; and generate a digital smart map including features corresponding to the extracted and subtracted first and second element data when the extraction and subtraction of the at least one target element data among the plurality of element data included in the unstructured map is completed.

* * * * *